INVENTORS
WILLIAM B. MCLEAN
JACK A. CRAWFORD

INVENTORS
WILLIAM B. MC LEAN
JACK A. CRAWFORD
BY
ATTORNEYS

United States Patent Office 2,822,511
Patented Feb. 4, 1958

2,822,511

MAGNETIC INTEGRATOR

William B. McLean and Jack A. Crawford, China Lake, Calif., assignors to the United States of America as represented by the Secretary of the Navy Application June 22, 1955, Serial No. 517,407

10 Claims. (Cl. 317—149)

(Granted under Title 35, U. S. Code (1952), sec. 266)

The invention described herein may be manufactured and used by or for the Government of the United States of America for governmental purposes without the payment of royalties thereon or therefor.

This invention relates to a magnetic integrator and more particularly to a device which will close a relay when the time integral of an input voltage is equal to a preset value.

The requirements for an integrator arises frequently in analog computing and control devices. Some of these applications require a continuous integral output while other applications require only that a signal be produced or a control operation occur when the integral of an input signal equals some predetermined value. It is this latter class of applications which can be satisfied by the magnetic integrator of this invention. Heretofore, a method of providing a signal when the time integral of a voltage reaches a predetermined value was by removing metal from one electrode of an electrolytic cell and depositing the metal on the other electrode. The metal removed was of a predetermined thickness. This method was used in the German V-2 rocket fuel shut-off system. The removal of the layer of metal increased the impedance of the cell greatly, and the phenomena was used to tell when the predetermined value had been reached. In the present invention, detecting means determine when a saturable core reactor which is saturated to a predetermined degree of saturation is returned to its initial condition.

An object of the invention is to provide a signal when the time integral of a voltage reaches a predetermined value.

Another object of the invention is to provide a device which will close a relay when the time integral of an input voltage is equal to a preset value.

A further object of the invention is to provide an integrator which is relatively insensitive to temperature changes.

A still further object of the invention is to provide an integrator which is easily reset so that it may be used again, has long life, is reliable in operation, and is easy to manufacture.

Other objects and many of the attendant advantages of this invention will be readily appreciated as the same becomes better understood by reference to the following detailed description when considered in connection with the accompanying drawings wherein.

Figure 1:
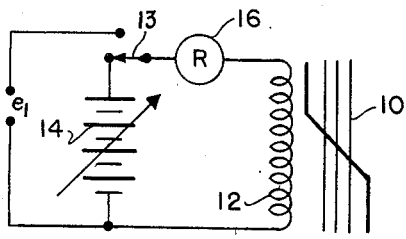
Fig. 1 is a simplified schematic diagram of the magnetic integrator.
Figure 2:
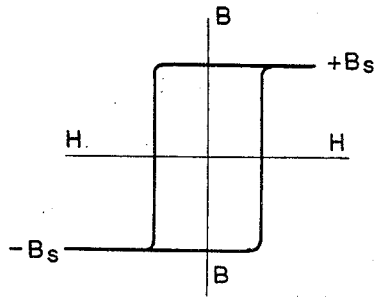
Fig. 2 shows a saturable reactor core hysteresis loop.

Shown in Fig. 1 of the drawings is a simplified schematic diagram of the basic magnetic integrator, and Fig. 2 shows a typical hysteresis loop for the saturable core 10 used in the device. The integrator accepts a variable input voltage 14 and closes a relay 16 when the integral of this voltage equals a preset number of volt-seconds.

The operation of the integrator may be explained by reference to the hysteresis loop of Fig. 2. Prior to the start of integration a D. C. presaturating voltage 14 is applied across coil 12 in such a direction as to drive the core 10 to negative saturation, $-B_s$, for example. At the start of integration this voltage is disconnected by means of switch 13, and a variable voltage $e_1$, which is to be integrated, is applied to coil 12 in such a direction as to reverse the direction of saturation. The applied voltage may change polarity provided the integral never returns to zero. By Faraday's law:

(1) $$e = KN\frac{d\phi}{dt} = KNA\frac{dB}{dt}$$

or integrating (2) $$\int_{t_1}^{t_2} e\,dt = KNA(B_{t_2} - B_{t_1})$$

$e$—voltage across coil
$N$—number of turns on coil
$\phi$—flux
$A$—core cross-section area
$B$—flux density
$B_s$—saturation flux density
$K$—constant where $B_{t_1}$ is the flux density at time $t_1$ and $B_{t_2}$ is the flux density at time $t_2$.

Equation 2 states that the integral of the voltage across coil 12 over any period of time is proportional to the change in core flux density $B$ over that same period of time. In the magnetic integrator, when the integration is started at a time $t_1$ the flux density $B_{t_1} = -B_s$ and triggering occurs at a time $t_2$ when flux density $B_{t_2} = +B_s$. Substituting these values into Equation 2

(3) $$\int_{t_1}^{t_2} e\,dt = KNA(B_s - [-B_s]) = 2KNAB_s$$

It is shown in Equation 3 that the integral of the voltage across coil 12 over the period of time for the core to pass from negative to positive saturation is a constant times the number of turns in the coil, times the core area, times the saturation flux density of the core. The cross-section area $A$ of the core 12 and the saturation flux density $B_s$ are fixed for a given core, leaving the number of turns $N$ as the variable which is adjusted to obtain the desired value of the integral at which triggering occurs. The impedance of coil 12 is relatively high while the core is unsaturated and drops when the core saturates. The low impedance of coil 12 when core 10 saturates permits enough current to flow through relay 16 to energize it. The integrator may also be used to determine when the magnitude of the time integrals of two voltages of different polarity are equal. To do this, the core is initially saturated. A first voltage is applied to drive the core from its initial condition of saturation. After the first voltage stops or is stopped, a second voltage is applied and drives the core back to its initially saturated condition. When the core returns to its initial condition, the integrals of the two voltages are equal.

Figure 3:
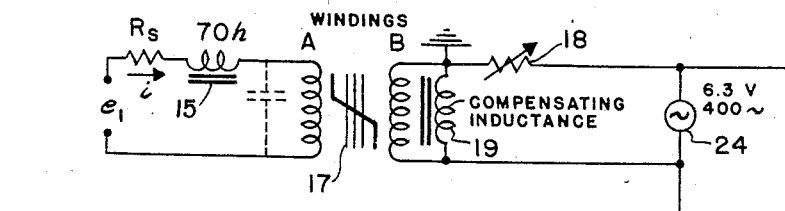
Fig. 3 illustrates a schematic diagram of the magnetic integrator with a vacuum-tube amplifier detector circuit.
Figure 3:
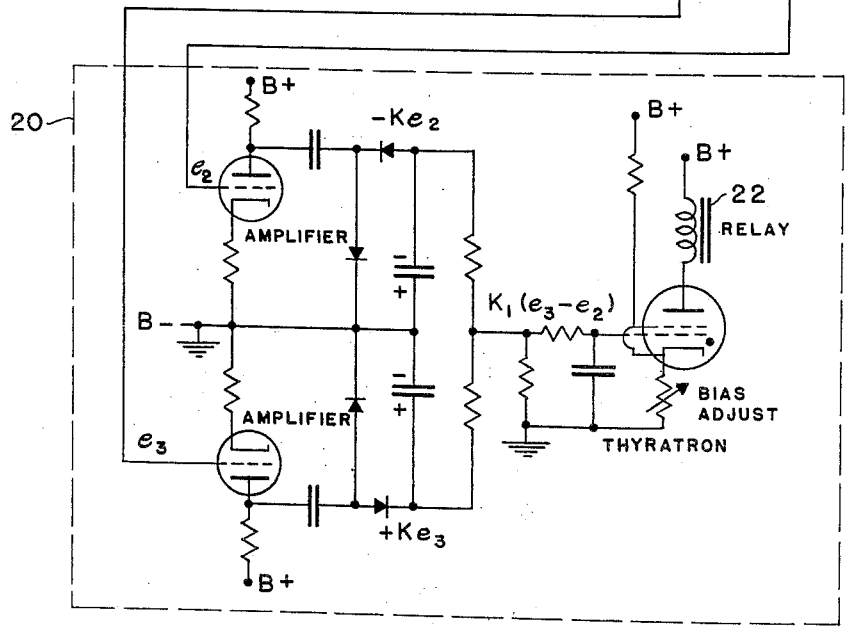

In Fig. 3 is shown a more complete and improved circuit for accomplishing the same function as that of Fig. 1. The voltage $e$, to be integrated is applied across winding A. The actual triggering is detected by means of the additional winding B which is placed on the core 17. Winding B is in series with resistor 18 and is supplied by an A. C. source 24, 6.3 volt, 400 cycle voltage, for example. The core 17 is unsaturated during integration and saturates at the time when the integral of voltage $e_1$ equals the preset triggering value. The A. C. impedance of winding B is relatively high while the core 17 is unsaturated and drops when the core saturates. The value of the resistor 18 is set to be equal to the unsaturated impedance of winding B so that voltage $e_2$, which is the portion of voltage source 24 appearing across resistor 18, and voltage $e_3$, which is the portion of voltage source 24 appearing across winding B and inductance 19, are equal during integration. When core 17 saturates, the impedance of winding B will drop causing the voltage $e_2$ to increase and the voltage $e_3$ to decrease. The electronic relay circuit 20 is of the conventional null-detector type which energizes relay 22 when the voltage $e_2$ is greater than the voltage $e_3$. Thus, the relay 22 will operate when the core 17 saturates.

A number of important practical considerations have been ignored in the foregoing explanation of magnetic integrators. The integrator schematic diagram of Fig. 3 will also be used to illustrate these considerations.

The combined resistance of the D. C. source $e_1$ and integrator coil A is shown as $R_s$, Fig. 3. The presence of this resistance causes the effective coil voltage to be $e = e_1 - iR_s$, where $e_1$ is the open circuit input voltage, and $i$ is the input current to the integrator. Substituting in Equation 3

$$\int_{t_1}^{t_2} e_1 - iR_s \, dt = 2KNAB.$$

The error in integration is kept small by keeping $i$ a minimum. The application of A. C. voltage to winding B reduces the D. C. input current to winding A to the order of one-fifth or one-tenth of its value without the A. C. on winding B. The residual error under these conditions is so small that it has been neglected.

Another consideration is that since the integrator coil is a transformer when unsaturated, A. C. on winding B will be shorted out through the load on winding A unless that load has a high impedance to A. C. A 70-henry choke 15, for example, is placed in the input circuit to avoid this trouble.

Figure 4:
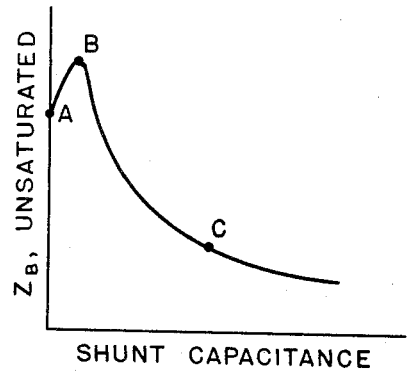
Fig. 4 is a curve illustrating the effect of shunt capacitance on unsaturated impedance of the detector winding on the saturable core.
Figure 5:
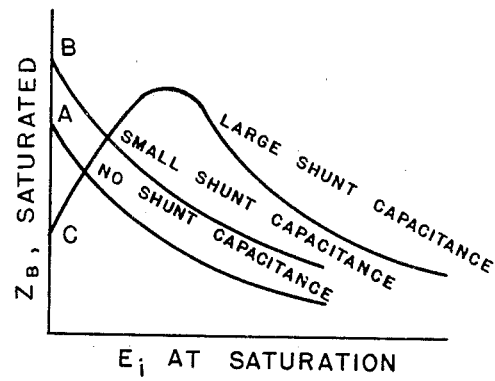
Fig. 5 are curves showing the saturated impedance of the detector winding vs. saturating voltage for three shunt capacitance conditions.

A more obscure source of trouble is stray capacitance in the windings. Winding A has 30,000 turns of wire, for example, as compared to 1,000 turns, for example, on winding B. Because of this 30-to-1 ratio, a capacitance C on winding A (illustrated by broken lines in Fig. 3) will be reflected into winding B as 900 C. The effect of shunt capacitance on unsaturated impedance of winding B is illustrated in Fig. 4. Points A, B and C in Fig. 4 represent curves A, B and C in Fig. 5, where they intersect the plane of Fig. 4, when $E_1$ at saturation is zero. Point A represents no shunt capacitance. At point B, Fig. 4, the capacitance has tuned the winding to resonance, while at point C the capacitance is much greater than the resonant value. Unfortunately, the stray capacitance in the circuit are enough to place the normal operating point at C. If the value of $e_1$ is small, then the core will not saturate completely at the end of integration. The partially saturated inductance of the winding may be enough to resonate with the stray capacitance and cause an increase in impedance. This effect is illustrated in Fig. 5 with three curves corresponding to the three points marked in Fig. 4. Curve C shows the increase of impedance with varying degrees of partial saturation. The unit will not trigger under this condition, since a decrease in impedance is required to trigger the relay circuits.

This difficulty has been overcome by the addition of a compensating induction 19 in Fig. 3. The inductor value is chosen to be resonant with the unsaturated winding inductance and stray capacitance. The unit will then operate on a curve similar to B of Fig. 5 and the integrator will trigger properly with small input voltages as well as large ones.

A conventional relay circuit 20, Fig. 3 may be used. The two incoming signals $e_2$ and $e_3$ are amplified in single R-C amplifier stages and then rectified. The rectified signals are fed into a mixing network, the output of which is the difference of the two outputs. The difference voltage drives a thyratron which is set to "fire" when the difference voltage is positive, indicating the $e_2$ is greater than $e_3$.

Figure 6:
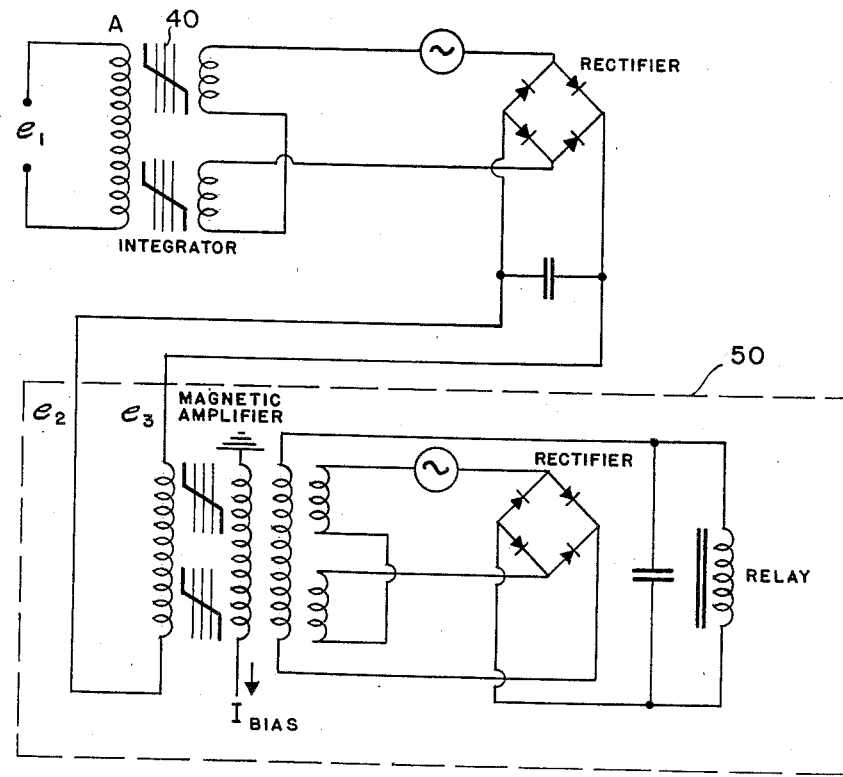
Fig. 6 is a schematic illustration of a magnetic amplifier detector circuit version of the magnetic integrator.

Another embodiment of the invention which also overcomes some of the disadvantages of the previously described basic circuit of Fig. 1 is illustrated in Fig. 6, where the single core integrator has been replaced with a 2-core integrator 40. A magnetic amplifier relay circuit 50 is used instead of a vacuum-tube type relay circuit as in Fig. 3. The use of the 2-core circuit, Fig. 6 in the integrator results in cancellation of induced voltages in the input winding A thus avoiding the problems associated with input winding capacitance and resonance.

Obviously, many modifications and variations of the present invention are possible in the light of the above teachings. It is therefore to be understood that within the scope of the appended claims, the invention may be practiced otherwise than as specifically described.

What is claimed is:

1. A magnetic integrator comprising a saturable reactor core capable of being positively or negatively saturated, a first winding and a second winding around said core, said core adapted initially to be either positively or negatively saturated, means for applying a voltage across said first winding in such a direction as to drive said core from its initial condition, a resistor in series with said second winding, the impedance of said resistor substantially equalling the impedance of said second winding when said core is unsaturated, a source of A. C. voltage in series with said second winding and resistor, and relay means operative when the voltages across said second winding and said resistor are substantially equal.

2. A device as in claim 1 wherein said relay means is an electronic relay of the null-detector type.

3. A device as in claim 1 wherein said relay circuit is a magnetic amplifier type circuit.

4. A magnetic integrator comprising a saturable reactor core capable of being positively or negatively saturated, a first winding and a second winding around said core, said core adapted initially to be either positively or negatively saturated, means for applying a voltage across said first winding in such a direction as to drive said core from its initial condition, a resistor in series with said second winding, the impedance of said resistor substantially equalling the impedance of said second winding when said core is unsaturated, a compensating inductance connected in parallel with said second winding to overcome stray capacitance in said windings, a source of A. C. voltage in series with said resistor and said second winding with its compensating inductance, and relay means operative when the voltages across said second winding and said resistor are substantially equal.

5. A device as in claim 4 wherein said relay means is an electronic relay of the null-detector type.

6. A device as in claim 4 wherein said relay circuit is a magnetic amplifier type circuit.

7. A magnetic integrator comprising a double core saturable reactor capable of being positively or negatively saturated, a first winding around said double core, said double-core adapted initially to be either positively or negatively saturated, means for applying a voltage across said first winding in such a direction as to drive said double-core from its initial condition, a double second winding, the two windings of said double second winding being connected in series in opposing fashion, a source of A. C. voltage in series with said double second winding, the output of said A. C. source and said double second winding being connected across a rectifier, said double-core reactor circuit in said integrator being such as to cancel the induced voltages in said first winding and relay means connected across the output of said rectifier for detecting when said double-core saturates and also for detecting when said double-core returns to its initial condition.

8. A device as in claim 7 wherein said relay means is a magnetic amplifier type circuit.

9. A device as in claim 7 wherein said relay means is an electronic amplifier type circuit.

10. A magnetic integrator comprising a two-core saturable reactor capable of being positively or negatively saturated, an input winding around said two cores, said two cores adapted initially to be either positively or negatively saturated, means for applying a voltage across said input winding in such a direction as to drive said two cores from their initial condition, two output windings connected in series so as to oppose each other, a source of A. C. voltage in series with said two output windings, said two-core reactor circuit in said integrator being such as to cancel induced voltages in said input winding, and relay means connected across the output of said two-second windings and A. C. source for detecting when said two-cores saturate and when they return to their initial condition.

References Cited in the file of this patent

UNITED STATES PATENTS 2,694,163    Sola _____ Nov. 9, 1954

UNITED STATES PATENT OFFICE
CERTIFICATE OF CORRECTION

Patent No. 2,822,511

February 4, 1958

William B. McLean et al.

It is hereby certified that error appears in the above numbered patent requiring correction and that the said Letters Patent should read as corrected below.

In the drawings, Sheet 1, Figure 3,

-- In electronic relay circuit 20, of Fig. 3, the diode (pointing up) which is connected between the output of $e_3$ amplifier and ground should be reversed to point downward. --.

Signed and sealed this 10th day of March 1959.

(SEAL)
Attest:
KARL H. AXLINE

Attesting Officer

ROBERT C. WATSON
Commissioner of Patents